United States Patent [19]

Sakashita et al.

[11] Patent Number: 5,606,008
[45] Date of Patent: Feb. 25, 1997

[54] PREPARATION METHOD OF POLYCARBONATE RESIN

[75] Inventors: Takeshi Sakashita, Utsunomiya; Tomoaki Shimoda, Moka; Takashi Nagai, Utsunomiya, all of Japan

[73] Assignee: General Electric Company, Pittsfield, Mass.

[21] Appl. No.: 506,280

[22] Filed: Jul. 21, 1995

[30] Foreign Application Priority Data

Jul. 22, 1994 [JP] Japan ................................. 6-171453

[51] Int. Cl.$^6$ ......................... C08G 64/00; B01J 31/00; B01J 27/24
[52] U.S. Cl. ..................... 528/199; 528/196; 528/198; 528/200; 502/150; 502/200; 524/107; 524/115; 524/155; 524/158; 524/165; 524/745; 524/746
[58] Field of Search ........................ 524/107, 115, 524/155, 158, 165, 745, 746; 528/196, 199, 198, 487, 200; 502/150, 200

[56] References Cited

U.S. PATENT DOCUMENTS

| | | | |
|---|---|---|---|
| 5,026,817 | 6/1991 | Sakashita et al. | 528/199 |
| 5,306,801 | 4/1994 | Sakashita et al. | 528/198 |
| 5,362,840 | 11/1994 | King et al. | 528/199 |
| 5,466,774 | 11/1995 | Kanno et al. | 528/199 |

FOREIGN PATENT DOCUMENTS

0520805A2  6/1992  Japan.

*Primary Examiner*—Terressa Mosley

[57] ABSTRACT

The purpose of the present invention is to provide a method for manufacturing polycarbonate in which polycarbonate having outstanding color matching, outstanding thermal properties, particularly retention stability during molding, and outstanding water resistance can be effectively and easily manufactured.

In the method for manufacturing polycarbonate of the present invention, an aromatic dihydroxy compound and a carbonic acid ester are subjected to melt condensation polymerization in the presence of a catalyst composed of (a) an aliphatic amine with 24–60 carbon atoms, and (b) an alkali metal compound and/or alkaline earth metal compound.

The (a) aliphatic amine having 24–60 carbon atoms should preferably be an aliphatic tertiary amine and be used in the amount of $1\times6^{-6}$–$1\times10^{-1}$ moles for each mole of the aromatic dihydroxy compound, and the (b) alkali metal compound and/or alkaline earth metal compound should be used in an extremely minute specified amount.

6 Claims, No Drawings

PREPARATION METHOD OF POLYCARBONATE RESIN

The present invention relates to a method for manufacturing polycarbonate, and more specifically, to a method for manufacturing polycarbonate in which polycarbonate having outstanding color matching, outstanding thermal properties, particularly retention stability such as thermal stability and color-matching stability during molding, and outstanding water resistance can be efficiently and easily manufactured.

Polycarbonate has outstanding mechanical properties such as impact resistance, it is outstanding in thermal resistance, transparency, etc., and it is widely applied in products such as various machine components, optical discs, and automobile components.

This polycarbonate has conventionally been manufactured by the method of direct reaction of an aromatic dihydroxy compound such as bisphenol with phosgene (the interfacial method) or the method of an ester exchange reaction between an aromatic dihydroxy compound and a carbonic acid diester.

Among these two methods, the melt method offers the advantage of allowing cheaper manufacturing of polycarbonate than the interfacial method. Moreover, the melt method is also preferred from the standpoint of environmental hygiene, as it does not use toxic substances such as phosgene.

Moreover, in the conventional melt method, as the polycarbonate produced is exposed to high temperatures for long periods during the manufacturing process, the polycarbonate may undergo yellow discoloration. Moreover, polycarbonate obtained by the conventional melt method has the problem areas of showing poor thermal properties, particularly retention stability such as thermal stability and color-matching stability during molding due to residual catalysts, it shows poor water resistance, and its transparency decreases during use.

In an effort to solve these problem areas, Japanese Laid-Open Patent No. 90-124934 presents a method in which a catalyst consisting of a combination of a nitrogen-containing basic compound and a minute amount of an alkali metal compound or alkaline earth metal compound is used in melt condensation polymerization of an aromatic dihydroxy compound with a carbonic acid diester. Moreover, Japanese Laid-Open Patent No. 5-9285 presents a method in which a minute amount of an alkali metal compound or alkaline earth metal compound is used as a catalyst in melt condensation polymerization of an aromatic dihydroxy compound and a carbonic acid diester, together with a method for neutralizing said catalyst using a sulfonic acid compound.

The inventors of the present invention conducted research in order to further improve this method of manufacturing polycarbonate by melt condensation polymerization, discovering that hen a catalyst consisting of a combination of a specified aliphatic amine and an extremely minute amount. of an alkali metal compound or alkaline earth metal compound is used in condensation polymerization of an aromatic lihydroxy compound and a carbonic acid diester, it is possible to carry out melt condensation polymerization with extremely high activity, and that one can thus efficiently and easily manufacture a polycarbonate showing outstanding color matching, outstanding thermal properties, particularly retention stability during molding, and outstanding water resistance.

In view of the conventional technology described above, the purpose of the present invention is to provide a method for manufacturing polycarbonate in which polycarbonate having outstanding color matching, outstanding thermal properties, particularly retention stability during molding, and outstanding water resistance can be effectively and easily manufactured.

The present invention relates to a method for manufacturing polycarbonate in which an aromatic dihydroxy compound and a carbonic acid ester are subjected to melt condensation polymerization in the presence of a catalyst composed of (a) an aliphatic amine with 24–60 carbon atoms, and (b) an alkali metal compound and/or alkaline earth metal compound.

The aforementioned (a) aliphatic amine having 24–60 carbon atoms should preferably be used in the amount of $1 \times 10^{-6} - 1 \times 10^{-1}$ moles for each mole of the aromatic dihydroxy compound. This (a) aliphatic amine should preferably be an aliphatic tertiary amine.

Moreover, the (b) alkali metal compound and/or alkaline earth metal compound should preferably be used in the amount of $5 \times 10^{-8} - 8 \times 10^{-7}$ moles for each mole of the aromatic dihydroxy compound, and more preferably in the amount of $5 \times 10^{-8} - 6 \times 10^{-7}$ moles, with the amount of $5 \times 10^{-8} - 4 \times 10^{-7}$ moles being particularly preferred.

In the present invention, the sulfonic acid compound [B] having Formula [III] shown below should preferably be added to the aforementioned reaction product [A] obtained by melt condensation polymerization in an amount greater by a molar factor of 1–10 than the amount of the (b) alkali metal compound and/or alkaline earth metal compound.

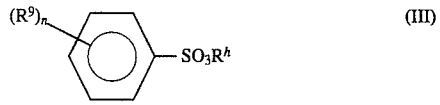

where $R^g$ is a hydrocarbon group or a halogen-substituted hydrocarbon group having 1–6 carbon atoms, $R^h$ is a hydrogen atom or a hydrocarbon group or halogen-substituted hydrocarbon group having 1–8 carbon atoms, and n is an integer from 0–3.

Moreover, together with the aforementioned sulfonic acid compound (B), an epoxy compound (C) should preferably be added to the polycarbonate which is reaction product (A).

Melt condensation polymerization of the aromatic dihydroxy compound and the carbonic acid diester carried out in the presence of a specified catalyst as described above should preferably be carried out at a higher level of activity than melt condensation polymerization reactions using conventional catalyst.

The method for manufacturing polycarbonate of the present invention makes it possible to effectively and easily manufacture polycarbonate which shows little discoloration immediately after manufacturing, shows outstanding thermal properties, particularly retention stability such as thermal stability and color-matching stability during molding, and has outstanding water resistance.

[Specific Explanation of the Invention]

The following is a specific explanation of the method for manufacturing polycarbonate of the present invention.

The method for manufacturing polycarbonate of the present invention involves manufacturing of polycarbonate by melt condensation polymerization of an aromatic dihydroxy compound and a carbonic acid diester in the presence of a specific catalyst to be mentioned below.

There are no particular restrictions on the aromatic dihydroxy compound used in the present invention, and an example is shown in Formula (I) below.

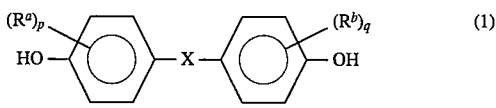

where $R^a$ and $R^b$ are halogen atoms or univalent hydrocarbon groups which may be identical or different, p and q are integers from 0 to 4.

X is [insert formula]—O—, —S—, —SO—, or —SO$_2$—, $R^c$ and $R^d$ are hydrogen atoms or monovalent hydrocarbon groups, and $R^e$ is a divalent hydrocarbon group.

Examples of the aromatic dihydroxy compound of Formula [I] include a bis(hydroxyaryl)alkane such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hyroxyphenyl)octane, bis(4-hydroxyphenyl)phenylmethane, 2,2-bis(4-hydroxy-1-methylphenyl)propane, 1,1-bis(4-hydroxy-t-butylphenyl)propane, or 2,2-bis(4-hydroxy-3-bromophenyl)propane; a bis(hydroxyaryl)cycloalkane such as 1,1-bis(4-hydroxyphenyl)cyclopentane or 1,1-bis(4-hydroxyphenyl)cyclohexane; a dihydroxyaryl ether such as 4,4'-dihydroxydiphenyl ether or 4,4'-dihydroxy-3,3'-dimethylphenyl ether; a dihydroxydiaryl sulfide such as 4,4'-dihydroxydiphenyl sulfide or 4,4'-dihydroxy-3,3'-dimethylphenyl sulfide; a dihydroxydiaryl sulfoxide such as 4,4'-dihydroxydiphenyl sulfoxide or 4,4'-dihydroxy-3,3'-dimethyldiphenyl sulfoxide; or a dihydroxydiaryl sulfone such as 4,4'-dihydroxydiphenyl sulfone or 4,4'-dihydroxy-3,3'-dimethyldiphenyl sulfone.

Among these compounds, the use of 2,2-bis(4-hydroxyphenyl)propane is particularly preferred.

Moreover, the compound shown in Formula (II) below may also be used as the aromatic dihydroxy compound.

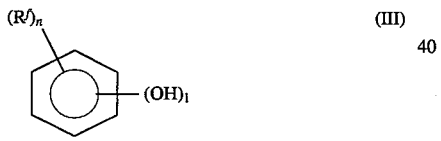

where $R^f$ is a halogen atom or a hydrocarbon group or halogen-substituted hydrocarbon group having 1–10 carbon atoms and n is an integer from 0 to 4. When n is 2 or above, $R^f$ may be either identical or different groups.

Specific examples of the aromatic dihydroxy compound shown in Formula [II] include resorcinol and substituted resorcinols such as 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, or 2,3,4,6-tetrabromoresorcinol;

catechol;

or a hydroquinone or a substituted hydroquinone such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, or 2,3,5,6-tetrabromohydroquinone.

Moreover, in the present invention, 2,2,',2'-tetrahydro-3,3,3',3'-tetramemthyl-1,1'-spirobis [1H-indene]-6,6'-diol may also be used as the aromatic dihdroxy compound.

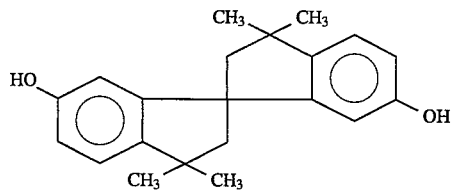

The aforementioned aromatic dihydroxy compound may also be a combination of 2 or more substances. Specific examples of the carbonic acid diester include diphenyl carbonate,
ditolyl carbonate,
bis(chlorophenyl) carbonate,
m-cresyl carbonate,
dinaphthyl carbonate,
bis(diphenyl) carbonate,
diethyl carbonate,
dimethyl carbonate,
dibutyl carbonate,
and dicyclohexyl carbonate.

Among these substances, diphenyl carbonate is particularly preferred.

These carbonic acid diesters may also be used in combinations of 2 or more substances.

The carbonic acid diester used in the present invention may contain a dicarboxylic acid or a dicarboxylic acid ester. Specifically, the carbonic acid diester may contain a dicarboxylic acid or a dicarboxylic acid ester in the amount of 50 mole % or less, and preferably 30 mole % or less.

Examples of this dicarboxylic acid or dicarboxylic acid ester include aromatic carboxylic acids such as terephthalic acid, isophthalic acid, diphenyl terephthalate, or diphenyl isophthalate;

aliphatic dicarboxylic acids such as succinic acid, glutaric acid, adipic acid, pimelic acid, suberic acid, azelaic acid, sebacic acid, decanedioic acid, dodecanedioic acid, diphenyl sebacate, diphenyl decanedioate, or diphenyl dodecanedioate;

and aliphatic dicarboxylic acids such as dichloropropanedicarboxylic acid, 1,2-cyclopropanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-dicyclohexanedicarboxylate, diphenyl 1,3-cyclohexanedicarboxylate, or diphenyl 1,4-cyclohexanedicarboxylate.

The carbonic acid diester may contain 2 or more of these dicarboxylic acids or dicarboxylic acid esters.

In the present invention, in condensation polymerization of the carbonic acid diester and aromatic dihydroxy compound as described above, one should ordinarily use 1.0–1.30 moles of the carbonic acid diester for each mole of the aromatic dihydroxy compound, with an amount of 1.01–1.20 moles being particularly preferred.

Moreover, in manufacturing polycarbonate by the method of the present invention, together with the aforementioned aromatic dihydroxy compound and carbonic acid diester, a polyfunctional compound having three or more functional groups per molecule may also be used.

A compound having a phenolic hydroxyl group or a carboxyl group should preferably be used as this polyfunctional compound, with compounds containing three phenolic hydroxyl groups being particularly preferred. Specific examples of this polyfunctional compound include 1,1,1-tris(4-hydroxyphenyl)ethane, 2,2',2"-tris(4-hydroxyphenyl)diisopropylbenzene, a-methyl-a,a',a"-tris(4-hydroxyphenyl)-1,4-diethylbenzene, a,a',a"-tris(4-hydroxyphenyl)-1,3,5-triisopropylbenzene, phloroglucinol, 4,6-dimethyl-2,4-6-tris(4-hydroxyphenyl)heptane-2 [sic], 1,3,5-tris(4-hydroxyphenyl)benzene, 2,2-bis[4,4-(4,4'-dihydroxyphenyl)cyclohexyl]propane, trimellitic acid, 1,3,5-benzenetricarboxylic acid, and pyromellitic acid.

Of these compounds, the use of 1,1,1-tris(4-hydroxyphenyl)ethane or a,a'-a"-tris(4-hydroxyphenyl)-1,3,5-triisopropylbenzene, etc., is particularly preferred.

The polyfunctional compound should preferably be present in the amount of 0.03 moles or less with respect to 1 mole of the aromatic dihydroxy compound, and more preferably in the amount of 0.001–0.02 moles, with 0.001–0.01 moles being particularly preferred.

In the present invention, the aromatic dihydroxy compound and carbonic acid diester described above are subjected to melt condensation polymerization in the presence of a catalyst consisting of a combination of (a) an aliphatic amine having 24–60 carbon atoms, and (b) an alkali metal compound and/or alkaline earth metal compound.

For the (a) aliphatic amine having 24–60 carbon atoms, a straight-chain, branched-chain, or alicyclic aliphatic amine may be used. Specific examples include primary amines such as tetracosylamine, heptacosylamine, hexacosylamine, heptacosylamine, octacosylamine, nonacosylamine, triacontylamine, tetracontylamine, pentacontylamine, and hexacontylamine, secondary amines such as didodecylamine, ditridecylamine, ditetradecylamine, dipentadecylamine, dihexadecylamine, diheptadecylamine, dioctadecylamine, dinonadecylamine, dieicosylamine, diheneicosylamine, didocosylamine, ditetrachlorodecylamine, and dihexachloroheptadecylamine, and tertiary amines such as trioctylamine, trinonylamine, tridecylamine, triundecylamine, tridodecylamine, tritridecylamine, tritetradecylamine, tripentadecylamine, trihexadecylamine, triheptadecylamine, trioctadecylamine, trinonadecylamine, trieicosylamine, tritetrachlorododecylamine, and trihexachloroheptadecylamine.

Of the above substances, a tertiary amine should preferably be used. Among the tertiary amines, a tertiary amine having 24–50 carbon atoms should preferably be used, with a tertiary amine having 30–45 carbon atoms being particularly preferred.

As will be mentioned below, in the latter half of the melt condensation polymerization reaction, the reaction is ordinarily carried out at a temperature in the vicinity of 250° C. and at a pressure of 5 mmHg or above, but the aforementioned tertiary amines having 30–45 carbon atoms in particular tend not to splash from the condensation polymerization reaction system even under these conditions. Accordingly, the condensation polymerization reaction can be maintained at a high level of activity.

Moreover, in the final stage of the melt condensation polymerization reaction, the reaction is ordinarily carried out at conditions of 1 mmHg or below and 250° C. or above, and a tertiary amine with 30–45 carbon atoms can easily be removed from the reaction system under these conditions.

In this manner, particularly when a tertiary amine having 30–45 carbon atoms is used, the condensation polymerization reaction can be carried out at a high level of activity, and one can obtain polycarbonate in which virtually none of the tertiary amine having 30–45 carbon atoms remains. Accordingly, one can obtain a polycarbonate with outstanding water-resistance and thermal properties with a high yield and in an easy manner.

Moreover, specific examples of the preferred (b) alkali metal compound or alkaline earth metal compound include organic acid salts, inorganic acid salts, oxides, hydroxides, hydrides, and alcoholates of alkali metals and alkaline earth metals.

More specifically, examples of the alkali metal compound include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium hydroxyborate, lithium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, and lithium salts of phenol, etc.

Furthermore, specific examples of the alkaline earth metal compound include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, and strontium stearate, etc.

These substances may be used in combinations of 2 or more.

In the present invention, the (b) alkali metal compound and/or alkaline earth metal compound should preferably be used in the amount of $5\times10^{-8}$–$8\times10^{-7}$ moles for each mole of the aforementioned aromatic dihydroxy compound, or more preferably $1\times10^{-7}$–$6\times10^{-7}$ moles, with the amount of $1\times10^{-7}$–$4\times10^{-7}$ moles being particularly preferred. This value should preferably be the amount of the (b) alkali metal compound and/or alkaline earth metal compound present in the reaction system.

Specifically, minute amounts of the (b) alkali metal compound and/or alkaline earth metal compound are present in the raw materials as impurities, and in such cases, the total amount of the (b) alkali metal compound and/or alkaline earth metal compound added as a catalyst and the (b) alkali metal compound and/or alkaline earth metal compound present in the raw materials as an impurity should preferably be the amount specified above.

However, as the amount of the (b) alkali metal compound and/or alkaline earth metal compound present in the raw materials as an impurity varies depending on the raw material used, in order to accurately control the amount of the (b)

alkali metal compound and/or alkaline earth metal compound present in the reaction system, it is preferred to purify the raw materials used in order to minimize the amount of the (b) alkali metal compound and/or alkaline earth metal compound present in the raw material. For example, the raw material should preferably be purified and used in the reaction in such a manner that the amount of the (b) alkali metal compound and/or alkaline earth metal compound present in the various components of the raw material is 1 ppb or less as calculated by metal conversion.

In this type of invention; the amount of the (b) alkali metal compound and/or alkaline earth metal compound present in the reaction system is lower than in conventional methods.

When an extremely minute amount of an alkali metal compound and/or alkaline earth metal compound is used as a catalyst in this manner, it is difficult to carry out condensation polymerization at a high level of activity, but in the present invention, as an (a) aliphatic amine with 24–60 carbon atoms is used together with the minute amount of the (b) alkali metal compound and/or alkaline earth metal compound, it becomes possible to carry out the condensation polymerization reaction at an extremely high activity level. Moreover, as the amount of the alkaline compound catalyst used is small, it becomes possible to easily manufacture carbonate having outstanding retention stability such as thermal stability and color-matching stability during molding, as well as outstanding water resistance.

A condensation polymerization reaction of this type carried out with an aromatic dihydroxy compound and a carbonic acid diester using a catalyst may be carried out under the same conditions known for conventional condensation polymerization.

Specifically, in the first stage, the aromatic dihydroxy compound and the carbonic acid diester are reacted at 80°–250° C., and more preferably 100°–230° C., with a temperature of 120°–190° C. being particularly preferred, and at ordinary pressure, usually for 5 minutes or less, and more preferably for 4 minutes or less, with a duration of 3 minutes or less being particularly preferred. Next, while keeping the reaction system at reduced pressure, the reaction temperature is increased, and finally, condensation polymerization of the aromatic dihydroxy compound and the carbonic acid diester is ordinarily carried out at a pressure of 5 mmHg or less, and preferably 1 mmHg or less, and at a temperature of 240°–320° C.

The condensation polymerization reaction described above may be carried out continuously or by the batch method. Moreover, the reaction equipment used in carrying out the above reaction may be of the tank type, the tube type, or the tower type.

The intrinsic viscosity [IV] of the polycarbonate obtained as a reaction product as described above, measured in methylene chloride at 20° C., is ordinarily 0.10–1.0 dl/g, and preferably 0.30–0.65 dl/g.

As the polycarbonate manufacturing method of the present invention described above does not use toxic substances such as phosgene or methylene chloride, it is desirable from the standpoint of environmental hygiene.

In the polycarbonate manufacturing method of the present invention, the (B) sulfonic acid compound of Formula [III] below should preferably be added to the [A] polycarbonate obtained as a reaction product as described above.

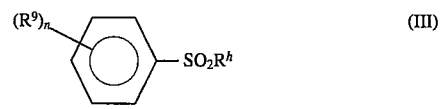

where $R^g$ is a hydrocarbon group or a halogen-substituted hydrocarbon group having 1–9 carbon atoms, $R^h$ is a hydrogen atom or a hydrocarbon group or halogen-substituted hydrocarbon group having 1–8 carbon atoms, and n is an integer from 0 to 3.

Specific examples of the (B) sulfonic acid compound include sulfonic acids such as benzenesulfonic acid and p-toluenesulfonic acid methyl benzenesulfonate, ethyl benzenesulfonate, butyl benzenesulfonate, octyl benzenesulfonate, or phenyl benzenesulfonate, and sulfonic acid esters such as methyl p-toluenesulfonate, ethyl p-toluenesulfonate, butyl p-toluenesulfonate, octyl p-toluenesulfonate, and phenyl p-toluenesulfonate.

Moreover, sulfonic acid compounds such as trifluoromethanesulfonic acid, naphthalenesulfonic acid, sulfonated polystyrene, and methyl acrylate-sulfonated styrene copolymer.

These substances may also be used in combinations of 2 or more.

Of the aforementioned (B) sulfonic acid compounds, a compound in which, in Formula [III], $R^g$ is a methyl group, $R^h$ is an aliphatic hydrocarbon group having 1–6 carbon atoms, and n is an integer from 0 to 1 should preferably be used, and specifically, p-toluenesulfonic acid or butyl p-toluenesulfonate should preferably be used.

In the present invention, the aforementioned sulfonic acid compound (B) should preferably be used in an amount greater by a molar factor of 1–10 than the amount of the (b) alkali metal compound and/or alkaline earth metal compound used as a catalyst, with a molar factor of 1–7 being preferred, and a molar factor of 1–4 being particularly preferred. By adding the sulfonic acid compound [B] to the reaction product (polycarbonate) (A) in this amount, the alkali metal compound present in the polycarbonate is neutralized or weakened, and one can finally obtain polycarbonate which has improved residence stability and water resistance.

In the method for manufacturing polycarbonate of the present invention, a (C) epoxy compound may be added to this (B) sulfonic acid compound.

A compound having 1 or more epoxy groups per molecule may be used as this (C) epoxy compound. Specific examples include epoxidized soy bean oil, epoxidized linseed oil, phenyl glycidyl ether, allyl glycidyl ether, t-butylphenyl glycidyl ether, 3,4-epoxycyclohexylmethyl 3',4'-epoxycyclohexanecarboxylate, 3,4-epoxy-6-methylcyclohexylmethyl 3',4'-epoxy-6'-methylcyclohexanecarboxylate 2,3-epoxycyclohexylmethyl 3',4'-epoxycyclohexanecarboxylate, 4-(3,4-epoxy-5-methylcyclohexyl)butyl 3,4'-epoxycyclohexanecarboxylate 3,4-epoxycyclohexylethylene oxide, cyclohexylmethyl 3,4-epoxycyclohexanecarboxylate, 3,4-epoxy-6-methylcyclohexylmethyl 6'-methylcyclohexanecarboxylate
bisphenol A diglycidyl ether,
tetrabromobisphenol A glycidyl ether,
diglycidyl ester of phthalic acid,
diglycidyl ester of hexahydrophthalic acid,
bis-epoxydicyclopentadienyl ether,
bis-epoxyethylene glycol [sic],
bis-epoxycyclohexyl adipate,
butadiene diepoxide,
tetraphenylethylene epoxide,
octylepoxy phthalate, [sic]
epoxidized polybutadiene,
3,4-dimethyl-1,2-epoxycyclohexane,
3,5-dimethyl-1,2-epoxycyclohexane,
3-methyl-5-t-butyl-1,2-epoxycyclohexane,
octadecyl 2,2-dimethyl-3,4-epoxycyclohexanecarboxylate,
n-butyl 2,2-dimethyl-3,4-epoxycyclohexanecarboxylate,
cyclohexyl 2-methyl-3,4-epoxycyclohexanecarboxylate,
n-butyl 2-isopropyl-3,4-epoxy-5-methylcyclohexanecarboxylate,
octadecyl 3,4-epoxycyclohexanecarboxylate,
2-ethylhexyl 3,'4,-epoxycyclohexanecarboxylate,
4,6-dimethyl-2,3-epoxycyclohexyl 3',4'-epoxycyclohexanecarboxylate,
4,5-epoxytetrahydrophthalic anhydride,
3-t-butyl-4,5-epoxytetrahydrophthalic anhydride,
diethyl 4,5-epoxy-cis-1,2-cyclohexanedicarboxylate,
and di-n-butyl 3-t-butyl-4,5-epoxy-cis-1,2-cyclohexanedicarboxylate.

Of the above substances, an alicyclic epoxy compound should preferably be used, with 3,4-epoxycyclohexylmethyl 3,4'-epoxycyclohexanecarboxylate being particularly preferred.

These substances may be also used in combinations of 2 or more.

In the present invention, this (C) epoxy compound should preferably be added to the aforementioned reaction product (polycarbonate) (A) in the amount of 1–2,000 ppm, and more preferably in the amount of 10–1,000 ppm.

When the epoxy compound (C) is added in these amounts, even if the aforementioned sulfonic acid compound [B] in the polycarbonate is present in excessive amounts as a residue, as this is neutralized in the reaction with the epoxy compound (C), it is possible to obtain a polycarbonate with particularly enhanced water resistance and which is resistant to loss of transparency. In the method for manufacturing polycarbonate of the present invention, a (D) phosphorus compound should preferably be added together with the (B) sulfonic acid compound.

Examples of this phosphorus compound (D) which may be used include phosphoric acid, phosphorous acid, hypophosphorous acid, pyrophosphoric acid, polyphosphoric acid, phosphoric esters, and phosphorous esters.

Examples of this phosphoric ester include trialkyl phosphates such as
trimethyl phosphate,
triethyl phosphate,
tributyl phosphate,
trioctyl phosphate,
tridecyl phosphate,
trioctadecyl phosphate,
distearylpentaerythrityl diphosphate,
tris(2-chloroethyl) phosphate,
tris(2,3-dichloropropyl) phosphate,
tricycloalkyl phosphates such as tricyclohexyl phosphate,
and triaryl phosphates such as triphenyl phosphate,
tricresyl phosphate,
tris(nonylphenyl) phosphate,
and 2-ethylphenyldiphenyl phosphate.

Moreover, the phosphorous ester has the following formula.

P(OR)$_3$ where R indicates an alicyclic hydrocarbon group, an aliphatic hydrocarbon group, or an aromatic hydrocarbon group. These may be either identical or different.

Examples of the compound indicated by his formula include trialkyl phosphites such as trimehyl phosphite,
triethyl phosphite,
tributyl phosphite,
trioctyl phosphite,
tris(2-ethylhexyl) phosphite,
trinonyl phosphite,
tridecyl phosphite,
trioctadecyl phosphite,
tristearyl phosphite,
tris(2-chloroethyl) phosphite,
and tris(2,3-dichloropropyl) phosphite,
tricycloalkyl phosphites such as tricyclohexyl phosphite,
triaryl phosphites such as triphenyl phosphite,
tricresyl phosphite,
tris(ethylphenyl) phosphite,
tris(2,4-di-t-butylphenyl) phosphite,
tris(nonylphenyl) phosphite,
and tris(hydroxyphenyl) phosphite,
and aryl alkyl phosphites such as phenyldidecyl phosphite,
diphenyldecyl phosphite,
diphenylisooctyl phosphite,
phenylisooctyl phosphite,
and 2-ethylhexyldiphenyl phosphite.

Moreover, examples of the phosphorous ester include
distearylpentaerythrityl diphosphite and
bis(2,4-di-t-butylphenyl)pentaerythrityl diphosphite.

These substances may also be used in combinations of 2 or more.

Among these substances, a phosphorous ester having the above-mentioned formula is preferred for use as the phosphorus compound [D], with aromatic phosphorous ester being preferred, and tris(2,4-di-t-butylphenyl) phosphite being particularly preferred.

In the present invention, the phosphorus compound (D) should preferably be added in the amount of 10–1,000 ppm, and more preferably 50–500 ppm, to the aforementioned reaction product (polycarbonate) (A).

In the present invention, when the epoxy compound (C) and/or phosphorus compound (D) is added together with the sulfonic acid compound (B) to the reaction product (polycarbonate) (A), these substances may be added either separately or simultaneously. These compounds may also be added in any desired order.

Moreover, when adding the sulfonic acid compound (B), the epoxy compound (C), and the phosphorus compound [D] to the reaction product (polycarbonate) (A), the reaction product (polycarbonate) may be added while in a molten state, or it may be added after the polycarbonate has been pelletized and then remelted. In the former case, these compounds (B) and (C) should be added to the polycarbonate reaction product obtained following completion of the condensation polymerization reaction in the reaction vessel or extruding machine while it is in a molten state.

Specifically, for example, after compounds (B), (C), and (D) are added to the reaction product (polycarbonate) (A) obtained through the condensation polymerization reaction in the reaction container and the polycarbonate is formed, it may be passed through an extruder and pelletized, or compounds (B), (C), and (D) may be added while the reaction product (polycarbonate) (A) obtained in the condensation polymerization reaction is passing from the reaction vessel through the extruder and being pelletized, and these may then be kneaded in order to obtain the polycarbonate.

Provided that this does not adversely affect the purpose of the present invention, substances such as ordinary heat-resistance stabilizers, ultraviolet absorbers, mold releasing agents, colorants, antistatic agents, slipping agents, anti-blocking agents, lubricants, defogging agents, natural oils, synthetic oils, waxes, organic fillers, and inorganic fillers may be added to the polycarbonate obtained by means of the present invention. These additives may be added together with the aforementioned compounds (B), (C), and (D), or they may be added separately.

Specific examples of the heat-resistance stabilizer mentioned above include phenolic stabilizers, organic thioether stabilizers, and hindered amine stabilizers.

Examples of phenolic stabilizers include n-octadecyl 3-(4-hydroxy-3,5'-di-t-butylphenyl)propionate, tetrakis[methylene-3(3',5'-di-t-butyl-4-hydroxyphenyl)propionate] methane, 1,1,3-tris(2-ethyl-4-hydroxy-5-t-butylphenyl)butane, distearyl (4-hydroxy-3-methyl-5-t-butylbenzyl)malonate, and 4-hydroxymethyl-2,6-di-t-butylphenol.

These substances may also be used in combinations of 2 or more.

Examples of thioether stabilizers include dilauryl thiodipropionate, distearyl thiodipropionate, dimyristyl 3,3'-thiodipropionate, ditridecyl 3,3'-thiodipropionate, and pentaerythritol tetrakis(beta-laurylthiopropionate).

These substances may also be used in combinations of 2 or more.

Examples of the hindered amine stabilizer include bis(2,2,6,6-tetramethyl-4-piperidyl) sebacate, bis(1,2,2,6,6-pentamethyl-4-piperidyl) sebacate, 1-[2-{3-(3,5-di-t-butyl-4-hydroxyphenyl)propionyloxy}ethyl]-4-{3-(3,5-di-t- butyl-4-hydroxyphenyl)propionyloxy}-2,2,6,6-tetramethylpiperidyl, 8-benzyl-7,7,9,9-tetramethyl-3-octyl-1,2,3-triazaspiro[4,5]undecane-2, 4-dione, 4-benzoyloxy-2,2,6,6-tetramethylpiperazine, 2-(3,5-di-t-butyl-4-hydroxybenzyl)-2-n-butylmalonate bis(1,2,2,6,6-pentamethyl-4-piperidyl), and tetrakis(2,2,6,6-tetramethyl-4-piperidyl) 1,2,3,4-butanetetracarboxylate.

These substances may also be used in combinations of 2 or more.

These thermal resistance stabilizers should be used in an amount of 0.001–5 parts by weight with respect to 100 parts by weight of polycarbonate, and preferably 0.005–0.5 parts by weight, with an amount of 0.01–0.3 parts by weight being particularly preferred.

This thermal resistance stabilizer may be added in either solid or liquid form.

As is the case for the above-mentioned compounds (B), (C), and (D), this thermal resistance stabilizer should preferably be added to the reaction product (polycarbonate) (A) while it is still in a molten state during the process of removal from the final polymerization vessel and cooling and pelletization. When one proceeds in this manner, the polycarbonate is subjected to heating only a few times, and in renewed thermal processing during extrusion molding and pelletization, as the polycarbonate contains the thermal resistance stabilizer, it is possible to inhibit thermal decomposition.

There are no particular restrictions on the ultraviolet absorber used in the present invention, with an ordinary ultraviolet absorber being suitable, such as a salicylic acid ultraviolet absorber, a benzophenone ultraviolet absorber, a benzotriazole ultraviolet absorber, or a cyanoacrylate ultraviolet absorber.

Specific examples of salicylic acid ultraviolet absorbers include phenyl salicylate and p-t-butylphenyl salicylate.

Examples of benzophenone ultraviolet absorbers include 2,4-dihydroxybenzophenone, 2-hydroxy-4-methoxybenzophenone, 2,2'-dihydroxy -4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenone trihydrate, 2-hydroxy-4-n-octyloxybenzophenone, 2,2',4,4'-tetrahydroxybenzophenone, 4-dodecyloxy-2-hydroxybenzophenone, bis(5-benzoyl-4-hydroxy-2-methoxyphenyl)methane, and 2-hydroxy-4-methoxybenzophenone-5-sulfonic acid.

Examples of benzotriazole ultraviolet absorbers include 2-(2'-hydroxy-5'-methylphenyl)benzotriazole, 2-(2'-hydroxy-3',5'-di-t- butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t-octylphenyl)benzotriazole, 2-(2'-hydroxy-3',5'-di-t-amylphenyl)benzotriazole, 2-[2'-hydroxy-3"-(3",4", 5"6"-tetrahydrophthalimidomethyl)-5'-methylphenyl] benzotriazole, and 2,2'-methylenebis[4-(1,1,3,3-tetramethylbutyl)-6-(2H-benzotriazol-2-yl)phenol].

Examples of cyanoacrylate ultraviolet absorbers include 2-ethylhexyl 2-cyano-3,3-diphenylacrylate and ethyl 2-cyano-3,3-diphenylacrylate.

These substances may also be used in combinations of 2 or more.

These ultraviolet absorbers are ordinarily used in the amount of 0.001–5 parts by weight with respect to 100 parts by weight of the polycarbonate, and preferably 0.005–10 parts by weight, with the amount of 0.01–0.5 parts by weight being particularly preferred.

There are no particular restrictions on mold-releasing agents, with a general mold-releasing agent being suitable.

For example, hydrocarbon mold-releasing agents which may be used include natural and synthetic paraffins, polyethylene waxes, and fluorocarbons.

Examples of fatty acid mold-releasing agents include higher fatty acids such as stearic acid and hydroxystearic acid and oxy fatty acids.

Examples of fatty acid amine mold-releasing agents include fatty acid amides such as stearic acid amide and ethylenebisstearamide and alkylenebis(fatty acid amide).

Examples of alcohol mold-releasing agents include aliphatic alcohols such as stearyl alcohol and cetyl alcohol, polyvalent alcohols, polyglycol, and polyglycerol.

Examples of fatty acid ester mold-releasing agents include fatty acid lower alcohol esters such as butyl stearate and pentaerythritol tetrastearate, fatty acid polyvalent alcohol esters, and fatty acid polyglycol esters.

Examples of silicone mold-releasing agents include silicone oil.

These substances may also be used in combinations of 2 or more.

These mold-releasing agents are ordinarily used in the amount of 0.001–5 parts by weight with respect to 100 parts by weight of the polycarbonate, and preferably 0.005–1 parts by weight, with the amount of 0.01–0.5 parts by weight being particularly preferred.

The colorant used may be a pigment or a dye. Colorants include inorganic and organic colorants, and either may be used, or a combination of the two may be used.

Specific examples of inorganic colorants include oxides such as titanium dioxide and red iron oxide, hydroxides such as aluminum white, sulfides such as zinc sulfide, selenium, ferrocyanides such as Prussian blue, chromates such as zinc chromate and molybdenum red, sulfates such as barium sulfate, carbonates such as calcium carbonate, silicates such as ultramarine, phosphates such as manganese violet, carbons such as carbon black, and metal powder colorants such as bronze powder and aluminum powder.

Specific examples of organic colorants include nitroso colorants such as naphthol green B, nitro colorants such as naphthol yellow S, azo colorants such as lithol red, Bordeaux 10B, naphthol red, and chromophthal yellow, phthalocyanine colorants such as phthalocyanine blue and fast sky blue, and condensation polycyclic colorants such as indanthrone blue, quinacridone violet, and dioxazine violet.

These substances may also be used in combinations of 2 or more.

These colorants are ordinarily used in the amount of $1 \times 10^{-6}$–5 parts by weight with respect to 100 parts by weight of the polycarbonate, and preferably $1 \times 10^{-5}$–3 parts by weight, with the amount of $1 \times 10^{-5}$–1 part by weight being particularly preferred.

In the method for manufacturing polycarbonate of the present invention, the polycarbonate obtained as described above should preferably be subjected to reduced-pressure treatment.

In carrying out such reduced-pressure treatment, there are no particular restrictions on the treatment device used, with examples including reaction vessels equipped with reduced-pressure units and extruders equipped with reduced-pressure units.

Either a vertical-tank-type reaction vessel or a horizontal-tank-type reaction vessel may be used, with a horizontal-tank-type reaction vessel being preferred.

In carrying out reduced-pressure treatment using the reaction vessel described above, treatment should be carried out at a pressure of 0.05–750 mmHg, and preferably at 0.05–5 mmHg.

Such reduced-pressure treatment should preferably be carried out for 10 seconds-15 minutes when using an extruder, and for 5 minutes-3 hours when using a reaction vessel. The reduced-pressure treatment should preferably be carried out at a temperature of approximately 240°–350° C.

Moreover, in carrying out reduced-pressure treatment in an extruder, either a uniaxial extruder equipped with a vent or a biaxial extruder may be used, and pelletization can be carried out during reduced-pressure treatment with the extruder.

In carrying out reduced-pressure treatment in an extruder, such treatment should be carried out under conditions of pressure of 1–750 mmHg, and preferably 5–700 mmHg.

When reduced-pressure treatment is carried out after adding substances such as a sulfonic acid compound [B], an epoxy compound [C], or a phosphorus compound [D] to the polycarbonate which is the reaction product, one can obtain polycarbonate with a reduced amount of residual monomers and oligomers.

Effect of the Invention

The method for manufacturing polycarbonate of the present invention makes it possible to carry out a melt condensation polymerization reaction in a stable manner with a high level of polymerization activity.

The present invention makes it possible to obtain polycarbonate which shows little discoloration immediately after melt condensation polymerization.

Moreover, the polycarbonate obtained according to the present invention has outstanding thermal properties, particularly residence stability during melt molding, it is resistant to thermal decomposition during molding, it is resistant to decreases in molecular weight and yellow discoloration, and it shows outstanding color-matching stability.

As the polycarbonate obtained according to the present invention can be used to form molded products showing outstanding color-matching stability and transparency over long periods, it can be used in a wide variety of applications, particularly in optical applications such as sheets, lenses, and compact discs, transparent components for outdoor use such as automobile components, and housings for various devices.

EXAMPLES

The following is an explanation of the present invention with reference to practical examples, but the invention is not limited to these examples.

In the present specification, the intrinsic viscosity (IV), MFR, color matching [YI], optical transmittance, haze, retention stability, and water resistance of the polycarbonate were measured in the following manner. Intrinsic viscosity (IV)

This was measured in methylene chloride at 20° C. using an Ubbelohde viscosimeter.

Yellow discoloration

An injection-molded plate measuring 3 mm in thickness was molded at a cylinder temperature of 290° C., an injection pressure of 1,000 kg/cm, a cycle time of 45 seconds, and a mold temperature of 100° C., X, Y, and Z values were measured using the ND-1001 DP Colorand color difference meter manufactured by Nihon Denshoku Kogyo K.K. using the transmission method, and yellow index [YI] was measured.

$$YI = 100 \, (1.277X - 1.060Z)/Y$$

Optical transmittance

This was measured according to the ASTM D 1003 method using an injection-molded plate for color matching measurement.

Haze

The haze of an injection-molded plate for color matching measurement was measured using an NDH-200 manufactured by Nihon Denshoku Kogyo K.K.

MFR

This was measured at 300° C. with a load of 1.2 kg according to the JIS K-7210 method.

Retention stability

After the resin was retained in the cylinder of an injection molding machine for 15 minutes at a temperature of 320° C., injection molding was carried out at this temperature, and the molded plate obtained was measured for MFR and color matching (YI).

Water resistance

An injection-molded plate for color matching measurement was immersed in water in an autoclave and then maintained at 125° C. in an oven for 5 days. Haze was then measured using this test piece.

Elemental analysis

Determination of alkali metals and alkaline earth metals in a 100 mg sample was carried out using a frameless atomic absorption spectrometer (Model TSX-10 manufactured by Mitsubishi Kasei K.K.).

As the results of elemental analysis of bisphenol A (manufactured by Nihon GE Plastics) showed that the amount of alkali metals and alkaline earth metals contained as impurities was 1 ppb or less, this substance was used as is as a raw material. Diphenyl carbonate (manufactured by Enia Co.) was purified by distillation, the amount of alkali metals and alkaline earth metals contained therein as impurities was confirmed to be 1 ppb or below, and the substance was then used as a raw material.

A 20% aqueous solution of tridodecylamine, tritetradecylamine, and tetramethylammonium hydroxide and 4-pyrrolidinopyridine was confirmed to contain 1 ppb of alkali metals and alkaline earth metals and used as a catalyst.

EXAMPLE 1

0.44 kilomoles of bisphenol A (abbreviated below as BPA) and 0.46 kilomoles of diphenyl carbonate were placed in a 250 l tank-type nitrogen-purged agitating tank and melted at 140° C.

Next, the temperature was increased to 180° C., 0.000176 mol ($4 \times 10^{-7}$ mol/mol-BPA) of sodium hydroxide and 0.11 tool ($2.5 \times 10^{-4}$ mol/mol-BPA) of tridecylamine were added as catalysts, and the mixture was agitated for 30 minutes.

While increasing the temperature to 210° C., the pressure was then gradually reduced to 200 mmHg, the temperature was then increased to 240° C. while gradually reducing the pressure to 15 mmhg, and the reaction was then allowed to proceed for 1 hour while distilling the phenol and keeping temperature and pressure constant.

Next, the reaction product was pressurized using a gear pump and continuously fed into a centrifuge-type evaporator at controlled temperature and pressure of 270° C. and 2 mmhg respectively, and polymerization was then carried out from the bottom of the vaporizer in a biaxial horizontal-type agitation polymerization tank (L/D=3, agitation vane rotation diameter 220 mm, internal volume 80 l) controlled using a gear pump to a final polymerization temperature of 293° C. and a pressure of 0.2 mmHg in order to reach the target IV (0.50). The volume produced was 50 kg/hr.

With the polymer in a molten state, it was then continuously fed into a biaxial extruder (L/D=17.5, barrel temperature 285° C.) using a gear pump, an amount of butyl p-toluenesulfonate greater by a molar factor of 2 than the added sodium hydroxide was added, the mixture was kneaded and passed through a die to obtain a strand shape, and it was then cut into pellets using a cutter.

The results are shown in Table 1.

Practical Examples 2–6

Pellets were obtained by the same method as in Practical Example 1, except for the fact that the catalysts and their amounts and the final polymerization temperature were modified.

Comparison Examples 1–6

Pellets were obtained by the same method as in Practical Example 1, except for the fact that the catalysts and their amounts and the final polymerization temperature were modified.

The results are shown in Table 1.

Example 7

Pellets were obtained by the same method as in Practical Example 1, except that in Practical Example 1, in addition to butyl toluenesulfonate, 300 ppm of 3,4-epoxycyclohexylmethyl 3,'4'-epoxycyclohexanecarboxylate (Seloxide 2021P; manufactured by Daicel Kagaku) and 300 ppm of tris(2,4-di-t-butylphenyl)phosphite (Mark 2112; manufactured by Adekagas) were added.

The results are shown in Table 1.

Comparison Example 7

Pellets were obtained by the same method as in Comparison Example 1, except that in Comparison Example 1, in addition to butyl p-toluenesulfonate, 300 ppm of 3,4-epoxycyclohexylmethyl 3,'4'-epoxycyclohexanecarboxylate (Seloxide 2021P; manufactured by Daicel Kagaku) and 300 ppm of tris(2,4-di-t-butylphenyl) phosphite (Mark 2112; manufactured by Adekagas) were added.

The results are shown in Table 1.

TABLE 1

| | Practical Example 1 | Practical Example 2 | Comparison Example 1 | Comparison Example 2 |
|---|---|---|---|---|
| Catalysts | | | | |
| (a) | Tridodecylamine | Tridodecylamine | Tetraammonium hydroxide | 4-pyrrolidinopyridine |
| Amount used ($10^{-4}$ mol/BPA) | 2.5 | 2.5 | 2.5 | 2.5 |
| (b) | Sodium hydroxide | Sodium hydroxide | Sodium hydroxide | Sodium hydroxide |
| Amount used ($10^{-7}$ mol/BPA) | 4.0 | 4.0 | 4.0 | 4.0 |
| Additives | | | | |
| [B] Sulfonic acid compound | Butyl p-toluenesulfonate | Butyl p-toluenesulfonate | Butyl p-toluenesulfonate | Butyl p-toluenesulfonate |
| Amount used (mol factor/ catalyst (b)) | 2.0 | 2.0 | 2.0 | 2.0 |
| [C] Epoxy compound | — | — | — | — |
| Amount used (ppm) | — | — | — | — |
| [D] Phosphorus compound | — | — | — | — |
| Amount used (ppm) | — | — | — | — |
| Target [IV] (dl/g) | 0.50 | 0.50 | 0.50 | 0.50 |
| Final polymerization temperature (°C.) | 293 | 293 | 293 | 293 |

TABLE 1-continued

| | | | | |
|---|---|---|---|---|
| Amount produced (kg/hr) | 50 | 53 | 40 | 35 |
| Initial physical properties | | | | |
| [IV] (dl/g) | 0.50 | 0.50 | 0.49 | 0.49 |
| YI | 1.40 | 1.40 | 1.41 | 1.83 |
| Optical transmittance (%) | 90.9 | 90.9 | 90.9 | 90.5 |
| Haze | 0.2 | 0.2 | 0.2 | 0.3 |
| MRF (g/10 min) | 10.0 | 10.1 | 10.4 | 10.2 |
| Retention stability | | | | |
| YI | 1.45 | 1.45 | 1.51 | 2.13 |
| MFR (g/10 min) | 10.2 | 10.2 | 10.6 | 13.1 |
| MFR increase rate (%) | 2 | 1 | 2 | 28 |
| Water resistance | 0.6 | 0.6 | 0.6 | 1.0 |
| Haze | | | | |

| | Practical Example 3 | Practical Example 4 | Comparison Example 3 | Comparison Example 4 |
|---|---|---|---|---|
| Catalysts | | | | |
| (a) | Tridodecylamine | Tridodecylamine | Tetraammonium hydroxide | 4-pyrrolidinopyridine |
| Amount used ($10^{-4}$ mol/BPA) | 2.5 | 2.5 | 2.5 | 2.5 |
| (b) | Sodium hydroxide | Sodium hydroxide | Sodium hydroxide | Sodium hydroxide |
| Amount used ($10^{-7}$ mol/BPA) | 2.0 | 2.0 | 2.0 | 2.0 |
| Additives | | | | |
| [B] Sulfonic acid compound | Butyl p-toluenesulfonate | Butyl p-toluenesulfonate | Butyl p-toluenesulfonate | Butyl p-toluenesulfonate |
| Amount used (mol factor/ catalyst (b)) | 2.0 | 2.0 | 2.0 | 2.0 |
| [C] Epoxy compound | — | — | — | — |
| Amount used (ppm) | — | — | — | — |
| [D] Phosphorus compound | — | — | — | — |
| Amount used (ppm) | — | — | — | — |
| Target [IV] (dl/g) | 0.50 | 0.50 | 0.50 | 0.50 |
| Final polymerization temperature (°C.) | 293 | 293 | 305 | 310 |
| Amount produced (kg/hr) | 45 | 47 | 25 | 15 |
| Initial physical properties | | | | |
| [IV] (dl/g) | 0.50 | 0.50 | 0.50 | 0.45* |
| YI | 1.38 | 1.38 | 1.52 | 2.25 |
| Optical transmittance (%) | 90.9 | 90.9 | 90.8 | 90.1 |
| Haze | 0.2 | 0.2 | 0.2 | 0.3 |
| MRF (g/10 min) | 10.0 | 10.0 | 10.0 | 15.2 |
| Retention stability | | | | |
| YI | 1.44 | 1.44 | 1.67 | 2.63 |
| MFR (g/10 min) | 10.1 | 10.1 | 10.6 | 19.8 |
| MFR increase rate (%) | 1 | 1 | 6 | 30 |
| Water resistance | 0.3 | 0.3 | 0.5 | 1.2 |
| Haze | | | | |

| | Practical Example 5 | Practical Example 6 | Comparison Example 5 | Comparison Example 6 |
|---|---|---|---|---|
| Catalysts | | | | |
| (a) | Tridodecylamine | Tridodecylamine | Tetrammonium hydroxide | 4-pyrrolidinopyridine |
| Amount used ($10^{-4}$ mol/BPA) | 2.5 | 2.5 | 2.5 | 2.5 |
| (b) | Sodium hydroxide | Sodium hydroxide | Sodium hydroxide | Sodium hydroxide |
| Amount used ($10^{-7}$ mol/BPA) | 2.0 | 2.0 | 2.0 | 2.0 |
| Additives | | | | |
| [B] Sulfonic acid compound | Butyl p-toluenesulfonate | Butyl p-toluenesulfonate | Butyl p-toluenesulfonate | Butyl p-toluenesulfonate |
| Amount used (mol factor/ catalyst (b)) | 2.0 | 2.0 | 2.0 | 2.0 |
| [C] Epoxy compound | — | — | — | — |
| Amount used (ppm) | — | — | — | — |
| [D] Phosphorus compound | — | — | — | — |
| Amount used (ppm) | — | — | — | — |
| Target [IV] (dl/g) | 0.50 | 0.50 | 0.50 | 0.50 |
| Final polymerization temperature (°C.) | 293 | 293 | 305 | 310 |
| Amount produced (kg/hr) | 44 | 46 | 22 | 13 |
| Initial physical properties | | | | |
| [IV] (dl/g) | 0.50 | 0.50 | 0.50 | 0.43* |
| YI | 1.39 | 1.38 | 1.51 | 2.27 |

TABLE 1-continued

|  | | | | |
|---|---|---|---|---|
| Optical transmittance (%) | 90.9 | 90.9 | 90.8 | 90.0 |
| Haze | 0.2 | 0.2 | 0.2 | 0.3 |
| MRF (g/10 min) | 10.0 | 10.0 | 10.0 | 18.4 |
| Retention stability | | | | |
| YI | 1.43 | 1.42 | 1.65 | 2.63 |
| MFR (g/10 min) | 10.1 | 10.1 | 10.5 | 24.1 |
| MFR increase rate (%) | 1 | 1 | 5 | 31 |
| Water resistance Haze | 0.4 | 0.4 | 0.6 | 1.5 |

| | Practical Example 7 | Comparison Example 7 |
|---|---|---|
| Catalysts | | |
| (a) | Tridodecylamine | Tetraammonium hydroxide |
| Amount used ($10^{-4}$ mol/BPA) | 2.5 | 2.5 |
| (b) | Sodium hydroxide | Sodium hydroxide |
| Amount used ($10^{-7}$ mol/BPA) | 4.0 | 4.0 |
| Additives | | |
| [B] Sulfonic acid compound | Butyl p-toluenesulfonate | Butyl p-toluenesulfonate |
| Amount used (mol factor/catalyst (b)) | 2.0 | 2.0 |
| [C] Epoxy compound | Seloxide 2021p | Seloxide 2021p |
| Amount used (ppm) | 300 | 300 |
| [D] Phosphorus compound | Tris(2,4 di-t-butylphenyl)phosphite | Tris(2,4 di-t-butylphenyl)phosphite |
| Amount used (ppm) | 300 | 300 |
| Target [IV] (dl/g) | 0.50 | 0.50 |
| Final polymerization temperature (°C.) | 293 | 293 |
| Amount produced (kg/hr) | 50 | 40 |
| Initial physical properties | | |
| [IV] (dl/g) | 0.50 | 0.49 |
| YI | 1.37 | 1.40 |
| Optical transmittance (%) | 90.9 | 90.9 |
| Haze | 0.2 | 0.2 |
| MRF (g/10 min) | 10.0 | 10.4 |
| Retention stability | | |
| YI | 1.39 | 1.41 |
| MFR (g/10 min) | 10.1 | 10.6 |
| MFR increase rate (%) | 1 | 2 |
| Water resistance Haze | 0.5 | 0.8 |

*Target could not be reached

We claim:

1. An improved method for manufacturing polycarbonate comprising melt condensation polymerizing an aromatic dihydroxy compound and a carbonic acid ester in the presence of a catalyst, wherein the improvement comprises melt condensation polymerizing the aromatic dihydroxy compound and the carbonic ester in the presence of from $1 \times 10^{-6}$ to $1 \times 10^{-1}$ moles for each mole of the aromatic dihydroxy compound of (a) an aliphatic amine with 24–60 carbon atoms, and from $5 \times 10^{-8}$ to $8 \times 10^{-7}$ moles for each mole of the aromatic dihydroxy compound of (b) an alkali metal compound or alkaline earth metal compound as the catalyst.

2. The method for manufacturing polycarbonate of claim 1, in which the aliphatic amine (a) is an aliphatic tertiary amine.

3. The method for manufacturing polycarbonate of claim 1, in which the alkali metal compound or alkaline earth metal compound (b) is used in the amount of $5 \times 10^{-8}$–$6 \times 10^{-7}$ moles for each mole of the aromatic dihydroxy compound.

4. The method for manufacturing polycarbonate of claim 1, in which the alkali metal compound or alkaline earth metal compound (b) is used in the amount of $5 \times 10^{-8}$–$4 \times 10^{-7}$ moles for each mole of the aromatic dihydroxy compound.

5. An improved method for manufacturing polycarbonate comprising melt condensation polymerizing (A) an aromatic dihydroxy compound and a carbonic acid diester in the presence of a catalyst wherein the improvement comprises melt condensation polymerizing (A) in the presence of from $1 \times 10^{-6}$ to $1 \times 10^{-1}$ moles for each mole of the aromatic dihydroxy compound of (a) an aliphatic amine with 24–60 carbon atoms, and from $5 \times 10^{-8}$ to $8 \times 10^{-7}$ moles for each mole of the aromatic dihydroxy compound of (b) an alkali metal compound or alkaline earth metal compound as the catalyst and adding (B) a sulfonic acid of the formula

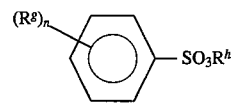

where $R^g$ is a hydrocarbon group or a halogen-substituted hydrocarbon group having 1–6 carbon atoms, $R^h$ is a hydrogen atom or a hydrocarbon group or halogen-substituted hydrocarbon group having 1–8 carbon atoms, and n is an integer from 0–3 in an amount greater by a molar factor of 1–10 than the alkali metal compound or alkaline earth metal compound (b) to a reaction product obtained through melt condensation polymerization.

6. An improved method for manufacturing polycarbonate comprising melt condensation polymerizing (A) an aromatic dihydroxy compound and a carbonic acid diester in the presence of a catalyst wherein the improvement comprises melt condensation polymerizing (A) in the presence of from $1\times10^{-6}$ to $1\times10^{-1}$ moles for each mole of the aromatic dihydroxy compound of (a) an aliphatic amine having 24–60 carbon atoms, and from $5\times10^{-8}$ to $8\times10^{-7}$ moles for each mole of the aromatic dihydroxy compound of (b) an alkali metal compound or alkaline earth metal compound as the catalyst and adding (B) a sulfonic acid of the formula

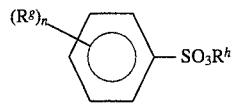

where $R^g$ is a hydrocarbon group or a halogen-substituted hydrocarbon group having 1–6 carbon atoms, $R^h$ is a hydrogen atom or a hydrocarbon group or halogen-substituted hydrocarbon group having 1–8 carbon atoms, and n is an integer from 0–3 in an amount greater by a molar factor of from 1 to 10 than the alkalimetal compound or alkaline earth metal compound (b) and (C) an epoxy compound in an amount of from 1 to 2000 ppm to a reaction product obtained through melt condensation polymerization.

* * * * *